(12) United States Patent
Kalinowski

(10) Patent No.: US 6,412,693 B1
(45) Date of Patent: Jul. 2, 2002

(54) SYSTEM AND METHOD FOR EFFECTING PARTICULAR FUNCTIONS IN CONTACTLESS LABELS

(75) Inventor: Richard Kalinowski, Carnoux en Provence (FR)

(73) Assignee: Gemplus (FR)

( * ) Notice: Subject to any disclaimer, the term of this patent is extended or adjusted under 35 U.S.C. 154(b) by 0 days.

(21) Appl. No.: 09/646,461

(22) PCT Filed: Mar. 12, 1999

(86) PCT No.: PCT/FR99/00558

§ 371 (c)(1),
(2), (4) Date: Dec. 4, 2000

(87) PCT Pub. No.: WO99/49410

PCT Pub. Date: Sep. 30, 1999

(30) Foreign Application Priority Data

Mar. 20, 1998 (FR) .............................. 98 03472

(51) Int. Cl.[7] .............................................. G06K 15/00
(52) U.S. Cl. .................. 235/383; 235/385; 235/487
(58) Field of Search ................. 235/383, 385, 235/487

(56) References Cited

U.S. PATENT DOCUMENTS

| 4,390,880 A | * | 6/1983 | Henoch ................. 343/6.8 LC |
| 5,036,308 A | * | 7/1991 | Fockens ..................... 340/5.8 |
| 5,426,667 A | * | 6/1995 | van Zon ..................... 375/219 |
| 5,587,578 A | * | 12/1996 | Serra ........................... 235/375 |
| 5,600,583 A | * | 2/1997 | Bosshart et al. ............ 708/525 |
| 5,600,683 A | * | 2/1997 | Bierach et al. ............. 375/363 |
| 5,632,010 A | * | 5/1997 | Briechle et al. ............. 345/1.1 |
| 5,675,323 A | * | 10/1997 | Ho ............................. 340/5.6 |
| 5,723,854 A | * | 3/1998 | Berney ....................... 235/491 |
| 5,838,235 A | * | 11/1998 | Thorigne .................... 235/449 |
| 5,914,980 A | * | 6/1999 | Yokota et al. .............. 375/130 |
| 6,087,981 A | * | 7/2000 | Normant et al. ............ 342/131 |
| 6,104,281 A | * | 8/2000 | Heinrich et al. ......... 116/137 A |
| 6,318,631 B1 | * | 11/2001 | Halperin .................... 235/383 |

FOREIGN PATENT DOCUMENTS

| FR | 2677135 | | 12/1992 |
| JP | 02000224043 A | * | 8/2000 |
| WO | WO98/29826 | | 7/1998 |

* cited by examiner

*Primary Examiner*—Karl D. Frech
*Assistant Examiner*—Daniel Walsh
(74) *Attorney, Agent, or Firm*—Burns, Doane, Swecker & Mathis, L.L.P.

(57) ABSTRACT

The invention concerns contactless electronic labels (10) associated with a reading device (40). The invention lies in the fact that the reading device (40) also comprises a generator generating sequences of pulses which characteristically modulate (50) a signal at a carrier frequency ($F_0$), the modulation making it possible to code information to be transmitted to the electronic labels. These sequences of pulses are detected (22) and interpreted (26) by the electronic labels (10) and supply different signals which act on certain circuits in the electronic labels, in particular for inhibiting certain functions.

48 Claims, 2 Drawing Sheets

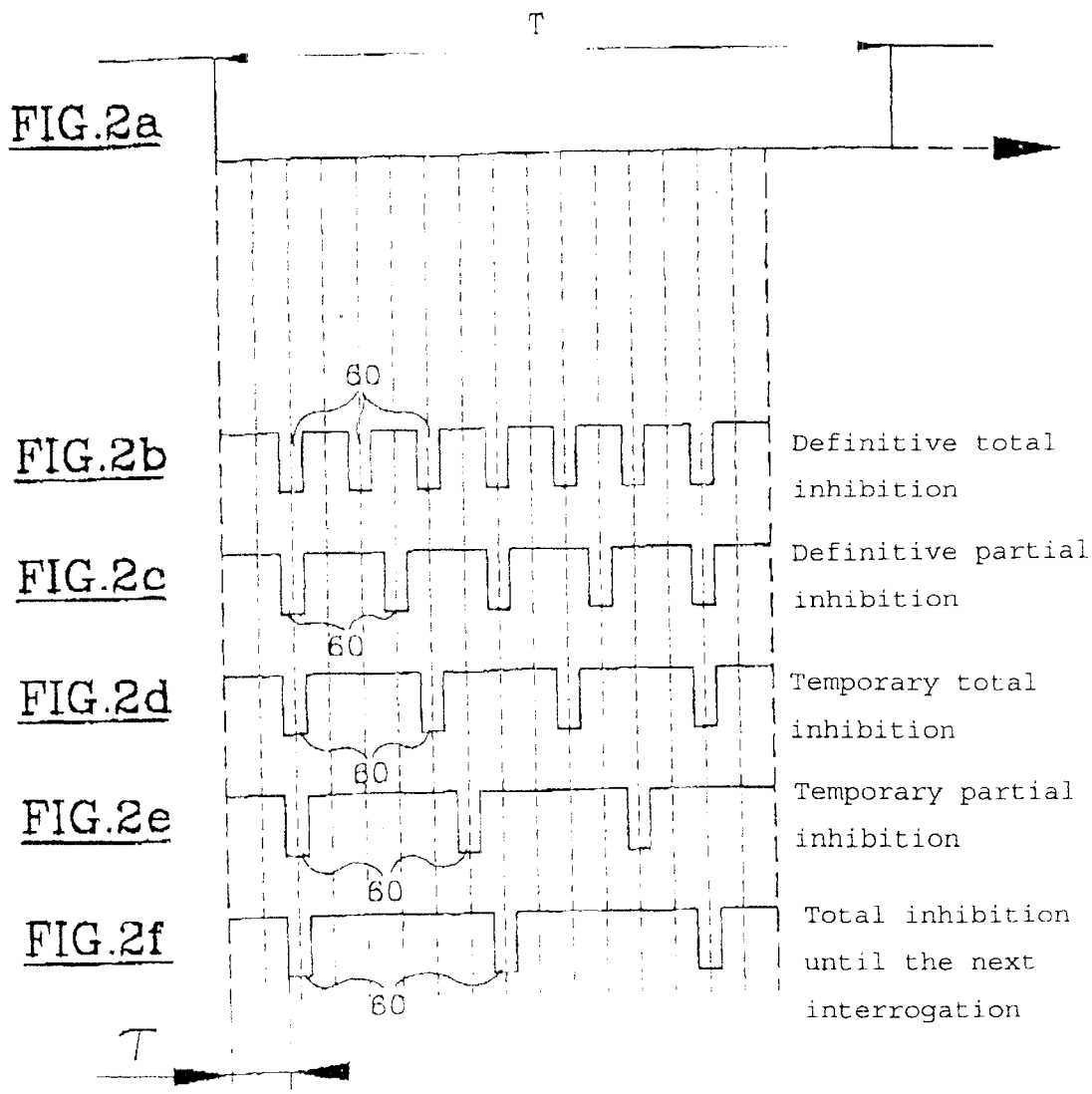

SYSTEM AND METHOD FOR EFFECTING PARTICULAR FUNCTIONS IN CONTACTLESS LABELS

This disclosure is based upon, and claims priority from, French Application No. 98/03472, filed Mar. 20, 1998, and International Application No. PCT/FR99/00558, filed Mar. 12, 1999, published by the International Bureau on Sep. 30, 1999, in a language other than English, the contents of which are incorporated herein by reference.

The present invention concerns the electronic labelling of products using labels each consisting of an electronic circuit disposed on a support adhering to the product to be identified. It concerns more particularly a system and method for temporarily or definitively inhibiting all or some functions of the label by means of a reading device.

More generally, the invention concerns a system and method for very rapidly effecting particular functions in contactless labels.

Products, in particular those for mass consumption, are identified by bar codes, which are read and analysed when they pass through the checkout so as to automatically determine their price by means of a data processing system. These bar codes are printed on the packaging of the product and define, for example, the name of the manufacturer and the type of product. These bar codes have a purely passive role and cannot be used for controlling the payment of the product, sell-by dates, the state of the stocks, theft, etc. Thus, in order to fulfil these new functions, it has been proposed to use active electronic labels consisting of a miniature electronic circuit or electronic chip carried by a support adhering to the product to be identified. These labels can be interrogated remotely by an interrogation and reading device and can respond by appropriate means.

These electronic labels record, for example, a number or code identifying the type of product such as an identical packet of rusks, an identical packet of butter, etc, as well as other codes indicating, for example, the sell-by date or the name of the manufacturer.

The so-called bottom of the range labels are generally produced by means of electronic circuits allowing only reading so that their content cannot change with a view to effecting certain functions which require writing to the label.

One of the functions which it would be advantageous to effect in an electronic label for reading alone is temporary or definitive inhibition in order to prevent use or reuse of the label or product when this is not authorised by the manufacturer. In addition, it would advantageous for this inhibition to be able to be total or partial.

SUMMARY OF THE INVENTION

One aim of the present invention is therefore to produce a system and to implement a method for temporarily or definitively inhibiting, partially or totally, electronic labels for contactless reading or for contactless reading/writing.

In more general terms, the invention aims to produce a system and to implement a method for permitting the use or not of certain functions of the electronic label for contactless reading or contactless reading/writing.

The invention therefore concerns a system for controlling particular functions in contactless electronic labels by means of a reading device transmitting, through a tuned-circuit antenna, signals at a carrier frequency $F_0$, modulated by a modulator, the said transmitted signals being detected by a tuned-circuit antenna disposed on each electronic label, characterised in that:

the reading device also comprises a generator generating a plurality of sequences of pulses, the said pulses in each sequence being applied to the modulator in order to characteristically modify the signal at the carrier frequency, the electronic label also comprises a circuit for detecting the pulses with a characteristic modulation and a circuit for interpreting the sequence of pulses, and each sequence of pulses signifies a different action on the circuits of the electronic label.

BRIEF DESCRIPTION OF THE DRAWING

Other characteristics and advantages of the present invention will emerge from a reading of the following description of a particular example embodiment, the said description being given in relation to the accompanying drawings, in which:

FIGS. 2a to 2f are diagrams of signals which are transmitted by the reading device to the electronic label in order to effect certain functions in the electronic label.

DETAILED DESCRIPTION

Figure 1:
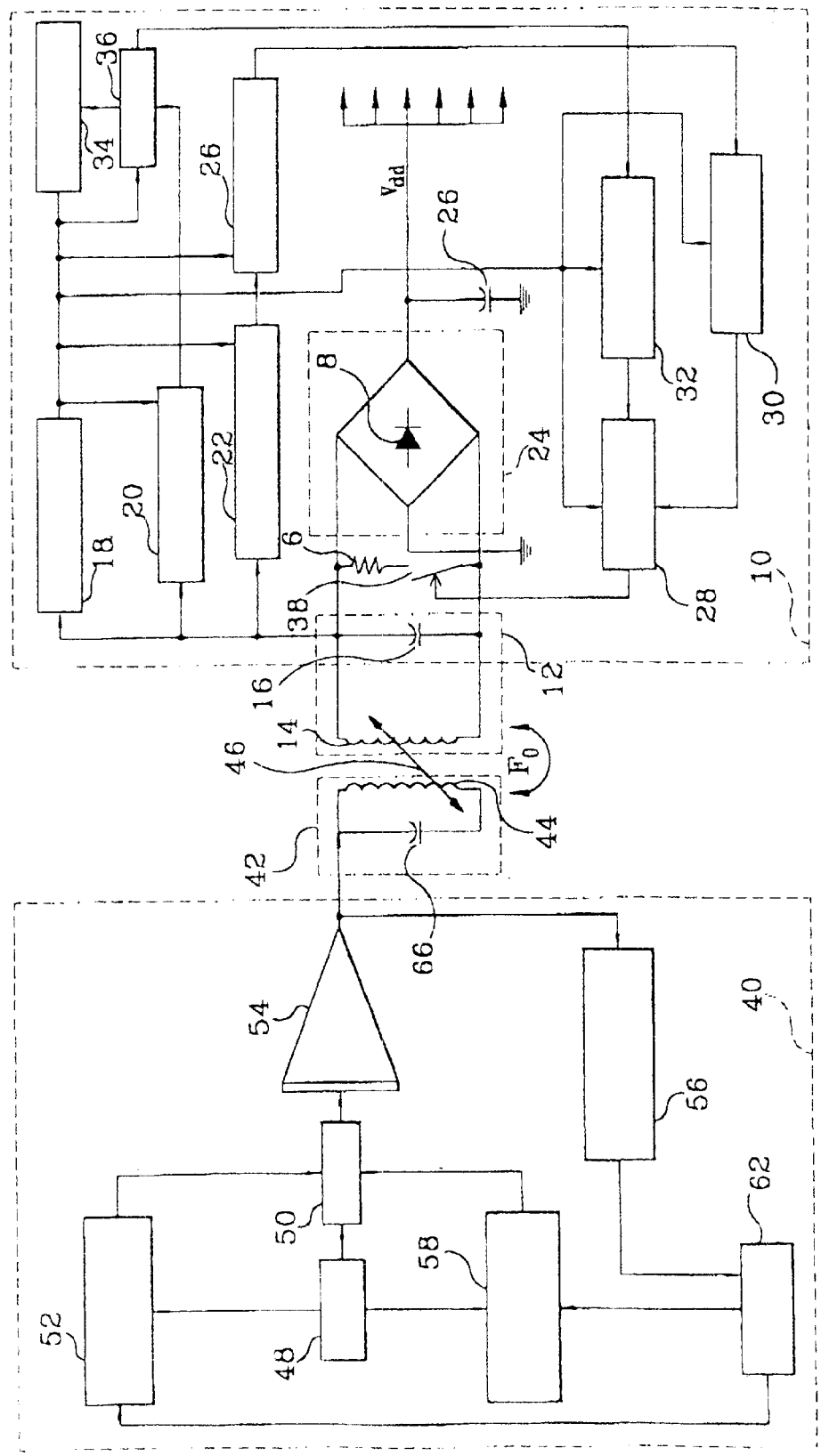
FIG. 1 is a functional diagram of a contactless electronic label and a device for reading such a label, according to the invention.

The invention will be described in the context of its application for obtaining the inhibition of certain functions of a contactless electronic label using a reading device, but it is clear that it also applies to more sophisticated systems for effecting a dialogue between the reader and the electronic label.

A contactless electronic label 10 comprises an antenna 12 consisting of a tuned-circuit which comprises a field winding 14 and a capacitor 16. The tuning frequency $F_0$ of the antenna 12 is for example 13.56 megahertz.

This tuned circuit of the antenna is connected to different circuits 18 to 24 which each effect a particular function. Thus the circuit 24 effects the function of full-wave rectifying of the signal at the terminals of the tuned circuit, for example by means of a diode bridge 8. This rectification circuit is followed by a filtering capacitor 26 for the rectified signal which supplies the supply voltage $V_{dd}$ of all the other circuits of the electronic label, notably those depicted in FIG. 1. The circuit 18 fulfils the so-called clock function and the synchronisation of the latter from the frequency $F_0$. The signals at different frequencies supplied by this clock circuit 18 are applied to the other circuits of the label, depicted or not, except for a rectifying circuit 24.

The circuit 20 fulfils the function of demodulation and decoding of the signals which modulate the signal at the carrier frequency $F_0$, signals which constitute the information received by the label.

The circuit 22 fulfils a function which is typical of the invention, that of detecting and measuring the sequences of extinction of the antenna magnetic field, as will be explained below.

The circuit 26 also fulfils a function typical of the invention, that of the interpretation of the sequences of extinction of the magnetic field, as will be explained below in relation to the diagrams in FIG. 2.

The signals resulting from the interpretation of the sequences of extinction of the magnetic field are applied to a circuit 28 for modulating the antenna load by means of a logic circuit 30. The modulation circuit 28 also receives the messages supplied by a circuit 32 which synthesises any digital messages which the label may transmit to the reader.

The antenna load modulator has been represented schematically by the circuit 28 and by a switch 38 in parallel to the tuned circuit which is controlled by the circuit 28. A load resistor 6 has been shown in series with the switch 38.

In addition to the circuits which have just been described and which are necessary to an understanding of the invention, the label comprises other electronic circuits such as a memory 34 where various items of information relating to the product carrying the label and the reading circuits 36 for this memory are recorded. These reading circuits 36 are under the control of the signals detected and decoded by the circuit 20 and supply signals which are applied to the message synthesis circuit 32.

The reading device or reader of the label 10 comprises in a known manner an antenna 42 consisting of a tuned circuit which comprises a field winding 44 and a capacitor 66, the tuning frequency being $F_0$. The two antennae 12 and 42 are coupled magnetically as depicted by the arrow 46 and the letter k represents the coupling coefficient.

The antenna 42 is supplied with electrical signals at the carrier frequency $F_0$ which are modulated by low-frequency digital signals conveying the information to be transmitted to the label 10. These modulated electrical signals are produced by a modulator 50 which receives on the one hand a signal at the frequency $F_0$ from an oscillator 48 and the modulation signals from a message generator 52. The output signals of the modulator 50 are applied to a power amplifier 54 whose output terminal is directly connected to the antenna 42.

The signals received by the antenna 42 are applied to a reception circuit 56 which detects, demodulates and decodes them.

According to the invention, the reader 40 also comprises an electromagnetic field extinction sequence generator 58 whose output signals control the modulator 50. These sequences are synchronised on the signal supplied by the oscillator 48 and can take the forms depicted in the diagrams in FIGS. 2b to 2f. The circuits 52 and 58 of the reader 40 are under the control of a microprocessor 62, the latter also having the function of analysing and interpreting the signals supplied by the circuit 56.

These extinctions of the electromagnetic field are obtained by a suppression on transmission of the signal at the carrier frequency $F_0$. However, instead of a complete suppression of the carrier, it is possible to use signals having an amplitude modulation of the carrier of a given value, at 50% for example.

For these extinctions of the electromagnetic field to be able to convey different items of information, the invention proposes to effect them at different frequencies according to the meaning to be given to them.

Thus, in the diagram of FIG. 2b, the extinction pulses 60 of the sequence produced by the generator 58 are at the frequency $F_r$ and signify, for example, a total and definitive inhibition of the label 10. The frequency $F_r$ is a sub-multiple of the frequency $F_0$.

In a similar manner, the extinction pulses 60 of the sequence of the diagram of FIG. 2c are, for example, at the frequency $F_r/1.5$ and signify, for example, a definitive inhibition of certain functions only, that is to say a partial definitive inhibition.

The extinction pulses of the diagram of FIG. 2d are, for example, at the frequency $F_r/2$ and signify, for example, a total but temporary inhibition of the functions of the label.

The extinction pulses in the diagram in FIG. 2e are, for example, at the frequency $F_r/2.5$ and signify, for example, a temporary inhibition of certain functions, that is to say a partial temporary inhibition.

Finally, the extinction pulses in the diagram in FIG. 2f are, for example, at the frequency $F_r/3$ and signify, for example, a total inhibition of the functions until the following interrogation of the label.

By way of example, a temporary inhibition will make it possible to produce an anti-theft system. Thus the operator, a checkout assistant for example, can at the time of payment invalidate the label before it passes under the security gate. The label can be validated once again, either at the expiry of an interval of time counted automatically and whose duration will be related to the energy stored in the label, or by an instruction from the reader.

A partial or total definitive inhibition can be implemented in order to produce an anti-fraud system for consumables, for example the ink packages or cartridges for photocopiers or printers, so as prevent their re-use.

This will be obtained by actuating an inhibition code in the label after the first use, which will prevent re-use.

On reception by the label 10, the pulses in the sequence transmitted by the reader 10 are detected by the circuit 22 and interpreted by the circuit 26 so as to determine the type of inhibition required by the reader.

As an indication, the frequency $F_r$ is 10 kHz, that is to say a period of 100 microseconds, and the duration of each pulse 60 is 5 to 20 microseconds.

According to another characteristic of the invention, these sequences of pulses are transmitted by the reading device at a particular moment in the dialogue between the electronic label and the reading device, for example a fixed interval of time τ after the reception of the last message transmitted by the label. In addition, the electronic label is put in the listening position for an interval of time T commencing after the transmission of the last message, the time T having to be sufficiently long to make it possible to interpret the sequences of pulses, for example a few milliseconds.

The invention has been described in its application to the obtaining of inhibitions but it is clear that it also applies to the effecting of any particular functions in the electronic label.

The invention has also been described in relation to a coding carried out on the frequency of a sequence of pulses but it can be implemented with other types of coding such as the amplitude of the modulation of the signal at the carrier frequency $F_0$ or modulation index, the position of the pulses within a described window of duration T or by a combination of these different parameters.

The system and method according to the invention can be implemented in parallel to the conventional system of exchange of information between the reader and electronic label. This exchange consists of transmitting digital codes which also amplitude modulate the signal at the carrier frequency $F_0$, but these digital codes are often long, which delays their complete decoding accordingly. Such a delay does not exist in the system and method of the invention, which makes it possible to perform operations in the electronic label very rapidly.

What is claimed is:

1. A method for controlling a contactless electronic label containing information that relates to a product with which the label is associated and that operates in a plurality of different modes, comprising the steps of:

transmitting to said label an information signal comprising a carrier signal that is modulated with message data;

selectively attenuating said information signal in accordance with one of a plurality of pulse sequences that are respectively associated with the different operating modes of the label;

receiving the information signal at the label and detecting the pulse sequence of attenuations in said signal; and controlling the label to operate in the mode associated with the detected pulse sequence.

2. The method of claim 1 wherein each of said operating modes modifies at least one function of the label.

3. The method of claim 2 wherein said operating modes inhibit at least one function of the label in different respective manners.

4. The method of claim 3 wherein one of said operating modes completely inhibits said one function and another operating mode temporarily inhibits said function.

5. The method of claim 4 wherein said other operating mode temporarily inhibits all functions of the label.

6. The method of claim 5 wherein said other operating mode inhibits all functions of the label until an occurrence of a subsequent event.

7. The method of claim 6 wherein said subsequent event is a subsequent transmission of an information signal.

8. The method of claim 1 wherein each of said pulse sequences has a frequency that is a sub-multiple of the frequency of said carrier signal.

9. The method of claim 1 wherein the selective attenuation of the information signal comprises suppression of the signal at the carrier frequency for a duration of each pulse in the pulse sequence.

10. The method of claim 1 wherein the selective attenuation of the information signal comprises a reduction in amplitude of the signal at a carrier frequency for a duration of each pulse in the sequence.

11. A method for controlling a contactless electronic label containing information that relates to a product with which the label is associated, comprising the steps of:

transmitting to said label an information signal comprising a carrier signal that is modulated with message data;

selectively attenuating said information signal in accordance with a pulse sequence;

receiving the information signal at the label and detecting the pulse sequence of attenuations in said signal; and inhibiting at least one function of the label in response to the detected pulse sequence.

12. The method of claim 11 wherein said information signal is suppressed in accordance with one of a plurality of different pulse sequences, and said inhibiting step is carried out in one of a plurality of different manners in accordance with the detected pulse sequence.

13. The method of claim 12 wherein one of said manners completely inhibits said function and another of said manners temporarily inhibits said function.

14. The method of claim 13 wherein said other manner temporarily inhibits all functions of the label.

15. The method of claim 14 wherein said other manner inhibits all functions until an occurrence of a subsequent event.

16. The method of claim 15 wherein said subsequent event is a subsequent transmission of an information signal.

17. The method of claim 11 wherein said function is completely inhibited.

18. The method of claim 11 wherein said function is temporarily inhibited.

19. The method of claim 18 wherein all functions are temporarily inhibited.

20. The method of claim 19 wherein all functions are temporarily inhibited until an occurrence of a subsequent event.

21. The method of claim 20 wherein said subsequent event is a subsequent transmission of an information signal.

22. The method of claim 12 wherein each of said pulse sequences has a frequency that is a sub-multiple of the frequency of said carrier signal.

23. The method of claim 11 wherein the selective attenuation of the information signal comprises suppression of the signal at a carrier frequency for a duration of each pulse in the pulse sequence.

24. The method of claim 11 wherein the selective attenuation of the information signal comprises a reduction in amplitude of the signal at a carrier frequency for a duration of each pulse in the sequence.

25. A system for controlling an electronic contactless label containing information that relates to a product with which the label is associated, comprising:

a reading device that transmits an information signal comprising a carrier signal that is modulated with message data, a sequence generator that generates a plurality of different pulse sequences, and a modulator that selectively attenuates said information signal in accordance with a pulse sequence generated by said sequence generator; and an electronic contactless label that operates in a plurality of different modes respectively associated with said different pulse sequences, and that includes a sequence detector that detects the pulse sequence of attenuations in a received information signal, and a controller for controlling said label to operate in the mode associated with the detected pulse sequence.

26. The system of claim 25 wherein each of said operating modes modifies at least one function of the label.

27. The system of claim 26 wherein said operating modes inhibit at least one function of the label in different respective manners.

28. The system of claim 27 wherein one of said operating modes completely inhibits said one function and another operating mode temporarily inhibits said function.

29. The system of claim 28 wherein said other operating mode temporarily inhibits all functions of the label.

30. The system of claim 29 wherein said other operating mode inhibits all functions of the label until the occurrence of a subsequent event.

31. The system of claim 30 wherein said subsequent event is a subsequent transmission of an information signal.

32. The system of claim 25 wherein each of said pulse sequences has a frequency that is a sub-multiple of the frequency of said carrier signal.

33. The system of claim 25 wherein the selective attenuation of the information signal comprises suppression of the signal at the a carrier frequency for a duration of each pulse in the pulse sequence.

34. The system of claim 25 wherein the selective attenuation of the information signal comprises a reduction in amplitude of the signal at a carrier frequency for a duration of each pulse in the sequence.

35. A system for controlling an electronic contactless label containing information that relates to a product with which the label is associated, comprising:

a reading device that transmits an information signal comprising a carrier signal that is modulated with message data, a sequence generator that generates a pulse sequence, and a modulator that selectively attenuates said information signal in accordance with a pulse sequence generated by said sequence generator; and an electronic contactless label that includes a sequence detector that detects the pulse sequence of attenuations in a received information signal, and a controller that inhibits at least one function of said label in response to the detected pulse sequence.

36. The system of claim 35 wherein said information signal is suppressed in accordance with one of a plurality of different pulse sequences, and said inhibiting step is carried out in one of a plurality of different manners in accordance with the detected pulse sequence.

37. The system of claim 36 wherein one of said manners completely inhibits said function and another of said manners temporarily inhibits said function.

38. The system of claim 37 wherein said other manner temporarily inhibits all functions of the label.

39. The system of claim 38 wherein said other manner inhibits all functions until an occurrence of a subsequent event.

40. The system of claim 39 wherein said subsequent event is a subsequent transmission of an information signal.

41. The system of claim 35 wherein said function is completely inhibited.

42. The system of claim 35 wherein said function is temporarily inhibited.

43. The system of claim 42 wherein all functions are temporarily inhibited.

44. The system of claim 43 wherein all functions are temporarily inhibited until the occurrence of a subsequent event.

45. The system of claim 44 wherein said subsequent event is a subsequent transmission of an information signal.

46. The system of claim 36 wherein each of said pulse sequences has a frequency that is a sub-multiple of a frequency of said carrier signal.

47. The system of claim 35 wherein the selective attenuation of the information signal comprises suppression of the signal at a carrier frequency for a duration of each pulse in the pulse sequence.

48. The system of claim 35 wherein the selective attenuation of the information signal comprises a reduction in amplitude of the signal at a carrier frequency for a duration of each pulse in the sequence.

\* \* \* \* \*